United States Patent [19]
Gasse et al.

[11] Patent Number: 5,935,697
[45] Date of Patent: Aug. 10, 1999

[54] HIGHLY TRANSPARENT THERMOFORMING FILM WITH A HEAT SEALING LAYER BASED ON POLYPROPYLENE AND LINEAR LOW DENSITY POLYETHYLENE

[75] Inventors: Andreas Siegmar Gasse; Rudi Klein, both of Walsrode, Germany

[73] Assignee: Wolff Walsrode AG, Walsrode, Germany

[21] Appl. No.: 08/638,411

[22] Filed: Apr. 26, 1996

[30] Foreign Application Priority Data

May 2, 1995 [DE] Germany ............................ 195 15 969

[51] Int. Cl.$^6$ .............................. B32B 27/32; B32B 27/34
[52] U.S. Cl. .................. 428/220; 428/423.5; 428/424.8; 428/475.8; 428/476.1; 428/476.3; 428/476.9
[58] Field of Search ...................... 428/219, 220, 428/423.5, 424.2, 424.8, 475.8, 476.1, 476.3, 476.9, 910

[56] References Cited

U.S. PATENT DOCUMENTS 4,540,416  9/1985  Hattori et al. ........................... 604/410
4,617,240  10/1986 Krueger et al. ....................... 428/476.1

FOREIGN PATENT DOCUMENTS 43 22 140 C1  8/1994  Germany .

OTHER PUBLICATIONS

Derwent Abstracts, AN 94–299929, Abstract of JP 06–228, 382, Aug. 16, 1994.

*Primary Examiner*—D. S. Nakarani
*Attorney, Agent, or Firm*—Sprung Kramer Schaefer & Briscoe

[57] ABSTRACT

The present invention relates to a highly transparent, sterilisation-resistant film, optionally containing polyamide, with elevated mechanical strength, which is thermoformable and heat-sealable, which film contains at least one layer of a polymer blend prepared from polypropylene (PP) and linear low density polyethylene (LLDPE), wherein the proportion of PP in the polymer blend is 81 to 99.8 wt. % and the proportion of LLDPE is 0.2 to 19 wt. % and the LLDPE has a density of between 915 and 950 kg/m$^3$, preferably of 925 to 940 kg/m$^3$.

10 Claims, No Drawings

HIGHLY TRANSPARENT THERMOFORMING FILM WITH A HEAT SEALING LAYER BASED ON POLYPROPYLENE AND LINEAR LOW DENSITY POLYETHYLENE

The present invention relates to a thermoforming film in particular containing polyamide with a heat sealing layer based on polypropylene (PP) and linear low density polyethylene (LLDPE). The film is distinguished by outstanding transparency and higher mechanical strength in comparison with films with pure PP or LLDPE heat sealing layers. The film is used inter alia as a sterilisation-resistant packaging film.

BACKGROUND OF THE INVENTION

Elevated requirements are placed upon films for packaging applications with regard to mechanical strength and optical properties, namely transparency. There is thus a constant effort to ensure optimum transparency. The transparency of composite films based on polyamides and polyolefins is elevated if the generally more turbid polyolefin layers may be made as transparent as possible. The emphasis should thus be placed on the transparency of the polyolefin heat sealing layer. According to the prior art, it is known that processing polyolefins using the blown film process gives rise to relatively turbid films, whereas material processed using the flat film process gives rise to crystal clear, transparent films (Hagen, H., Domininghaus, H.: *Polyethylen und andere Polyolefine*, Verlag Brunke Garrels, Hamburg 1961, pp. 175 et seq.). This applies in particular also to polypropylene. However, since blown films have other attractive properties, efforts are being made to invent film formulations which improve transparency, irrespective of the production process.

It has been suggested to achieve this by a polymer blend prepared from PP and LLDPE. Film formulations are known from the patent literature, which, in order to achieve this object, contain above 50 wt. % of LLDPE and are thus by their nature more LLDPE films than PP films (JP 5 8217 534, EP 350 859, EP 423 387, U.S. Pat. No. 5,139,855, EP 0 350 859).

It has also been found that mixtures prepared from PP and LLDPE, which predominantly contain PP (JP 5 7159 832, JP 01152 144, WO 9214784) yield transparent films. A feature common to all these developments is that 20 wt. % or above of LLDPE are required to achieve this object.

EP-397 517 A also describes a polymer blend prepared from PP and LLDPE which contains 0.5 to 20 wt. % of LLDPE. According to the prior art it is clearly possible to incorporate such small quantities of LLDPE into PP only if the PP and the LLDPE are as similar as possible. Such similarity is defined by density. The density of PP is approximately 900 to 910 kg/m³, that of the LLDPE, which is described as a blend component, is in the range from 860 to 910 kg/m³. An LLDPE of such a low density is also known as VLDPE (very low density polyethylene).

The object thus arises of providing a film containing polypropylene which may be produced using the blown film or flat film process. The decisive properties of the film to be provided comprise elevated transparency with simultaneously high mechanical strength. The film may be both a single layer film and a multi-layer film.

SUMMARY OF THE INVENTION

It has surprisingly proved possible to provide a highly transparent, sterilisation-resistant film, optionally containing polyamide, with elevated mechanical strength, which is thermoformable and heat-sealable, which film contains at least one layer of a polymer blend prepared from polypropylene (PP) and linear low density polyethylene (LLDPE), which is characterised in that the proportion of PP in the polymer blend is 81 to 99.8 wt. % and the proportion of LLDPE is 0.2 to 19 wt. % and the LLDPE has a density of between 915 and 950 kg/m³, preferably of 925 to 940 kg/m³.

The PP is a polypropylene homopolymer or a polypropylene copolymer prepared from propylene and a C2 or C4 to C12 alpha olefin. The PP is preferably an ethylene/propylene copolymer with an ethylene content of 1 to 9 mol. %.

The LLDPE is a copolymer prepared from ethylene and a C3 to C12 alpha olefin with a melt flow index (MFI 190/2.16) of 0.1 to 20 g/10 min. C4 and in particular C8 alpha olefins are preferably used in this case.

In a preferred embodiment, the film additionally contains at least one polyamide layer. The polyamide consists of the aliphatic polyamides PA 6, PA 11, PA 12, PA 66, PA 6,66, PA 6,8, PA 6,9, PA 6,10, PA 6,11, PA 6,12, a copolymer prepared from the monomer units contained therein, of an aromatic or partially aromatic polyamide or of a mixture of the stated polyamides.

In a preferred embodiment, the film moreover contains at least one bonding layer consisting of an adhesive system (K) and/or a polymeric coupling agent (HV). The adhesive system is preferably a 2-component polyurethane adhesive system. The polymeric coupling agent is an anhydride-modified polyethylene, an acid copolymer of ethylene, an acid-modified ethylene vinyl acetate, an acid-modified ethylene (meth)acrylate, anhydride-modified ethylene (meth) acrylate, an anhydride-modified ethylene vinyl acetate, an acid/acrylate-modified ethylene vinyl acetate or a polymer blend containing at least one of the stated coupling agents. The coupling agent is preferably an anhydride-modified ethylene/propylene copolymer. Of these, maleic anhydride grafted ethylene/propylene copolymers are particularly preferred.

The film may, for example, have the structure polyamide/bonding layer/polymer blend or polyamide/bonding layer/polyamide/bonding layer/polymer blend. If the described polymer blend is used as the heat sealing layer, the following film structures are conceivable:
1. PA/HV/PA/HV/heat sealing layer
2. PA/HV/heat sealing layer
3. PA/EVOH/PA/K/heat sealing layer
4. PA/K/heat sealing layer
5. PA/HV/PA/HV/PP/heat sealing layer
6. PA/HV/PP/heat sealing layer
7. PA/HV/PA/K/PP/heat sealing layer
8. PA/HV/PA/K/heat sealing layer etc.

The total thickness of the film, provided that it is not a single layer film, is in the range from 15 to 400 µm, preferably from 50 to 300 µm. If the described polymer blend is used as the heat sealing layer material, the heat sealing layer should constitute 5 to 90%, preferably 10 to 80% of the total film thickness.

The film may, in principle, additionally contain conventional additives and auxiliary substances. In order to modify surface slip properties of the film, at least one layer may contain a lubricant and/or anti-blocking agent. Anti-blocking agents should here preferably be added to the outer layers of the film, while lubricants may also be added to the internal layers.

The film is suitable for printing. At least one layer may be coloured or printed.

The film is in particular suitable for packaging applications, in particular for packaging foodstuffs. The film may effectively be used both for hot filling and for heating pack contents in the film up to sterilisation temperatures. The film is suitable for packaging meat and sausage products, milk products, fish and smoked foodstuffs, pre-cooked dishes, bread and bakery goods and medical devices.

It surprisingly proved possible to satisfy the particular requirements for transparency and mechanical strength by means of the film composition according to the invention. On the basis of the prior art, it was not to have been expected that a mixture of PP and LLDPE, wherein the proportion of LLDPE is 0.2 to 19 wt. % and the density of the LLDPE is distinctly above that of the PP would be extrudable and processable into a film. It has surprisingly been found that a polymer blend of the stated composition may be processed into a film which is more transparent than the individual components contained in the polymer blend. It was also surprising that the mechanical strength of the complete film is greater than that of the individual components.

Production processes which may be considered for the film are coextrusion (blown film or flat film) or also individual production of the required layers, which are then laminated together. Combined processes are also conceivable.

Known, conventional prior art plant designs are used, wherein in the case of blown film coextrusion the production process is characterised in that the melt is shaped into a film bubble, inflated, cooled and the other, now cool, end is flattened by pinch rolls and held closed and the film then wound. In the case of flat film coextrusion, so-called chill roll units are used, which have the particular feature of large cooling rolls which receive the molten film leaving the die.

The invention is evaluated by laminating a film produced according to the invention with a 70 μm gauge polyamide (PA) film to yield a composite film and turbidity as the optical parameter and mechanical properties of this composite film are measured.

Turbidity is measured in % turbidity corresponding to % haze according to ASTM test standard D 1003-61m, procedure A, once the measuring device has been calibrated with turbidity standards of between 0.3 and 34% turbidity. Measurement was made with a Byk-Gardner hazemeter with an Ulbricht sphere, which allows an integrated measurement of diffuse light transmission at an angle of 8 to 160°.

In parallel to turbidity measurement, the secant modulus, 5% offset yield stress and yield stress were determined by tensile testing as a measure of the mechanical strength of the composite film. Tensile testing was performed to DIN 53 455. In this connection, the secant modulus is the slope of the stress-strain curve between 0.05 and 0.25% extension relative to the clamping cross-section, the 5% offset yield stress is the stress at 5% extension and the yield stress is the tensile stress at which the slope of the stress-strain curve first becomes equal to zero (see definition in DIN 53 455). Testing was performed on specimens 15 mm in width at 23° C. and 50% relative atmospheric humidity. Test speed was 100 mm/min.

The following examples are intended to illustrate the subject matter of the invention.

A. EXAMPLE 1

Multi-layer film with the structure
PA/K/(97% PP1+3% LLDPE)
70/-/65 μm

The (PP+LLDPE) blend contains 3 wt. % LLDPE. The film was produced from the PP1 and LLDPE polymer blend by the blown film process and then laminated using a solvent-based adhesive system K (adhesive application rate: 3.5 g/m$^2$) with the PA film to yield the composite film. The PA used was polyamide 6 of a density of 1140 kg/m$^3$ with a crystallite melting point of 219° C. and a relative solution viscosity of 3.8 (PA concentration 1%, temperature 25° C., measured in m-cresol), PP1 was an ethylene/propylene copolymer of a density of 900 kg/m$^3$ with a crystallite melting point of 149° C. and a melt flow index (MFI 230/2.16) of 6 g/10 min and the LLDPE used was a copolymer prepared from ethylene and octene of a density of 935 kg/m$^3$, a crystallite melting point of 126° C. and a melt flow index (MFI 190/2.16) of 4.4 g/10 min.

B. EXAMPLE 2

Multi-layer film with the structure
PA/K/(94% PP1+6% LLDPE)
70/-/65 μm

Film production and polymers as described in example 1.

C. EXAMPLE 3

Multi-layer film with the structure
PA/K/(88% PP1+12% LLDPE)
70/-/65 μm

Film production and polymers as described in example 1.

D. EXAMPLE 4

Multi-layer film with the structure
PA/K/(90% PP2+10% LLDPE)
70/-/50 μm

The film was produced as described in example 1. Polyamide PA, adhesive system K and LLDPE are identical to those from example 1. PP2 was an ethylene/propylene copolymer of a density of 900 kg/m$^3$ with a crystallite melting point of 138° C. and a melt flow index (MFI 230/2.16) of 5 g/10 min.

E. Comparative example 1

Multi-layer film with the structure
PA/K/PP1
70/-/65 μm

Film production and polymers as described in example 1.

F. COMPARATIVE EXAMPLE 2

Multi-layer film with the structure
PA/K/(76% PP1+24% LLDPE)
70/-/65 μm

Film production and polymers as described in example 1.

G. COMPARATIVE EXAMPLE 3

Multi-layer film with the structure
PA/K/LLDPE
70/-/65 μm

Film production and polymers as described in example 1.

H. COMPARATIVE EXAMPLE 4

Multi-layer film with the structure
PA/K/PP2
70/-/50 μm

Film production and polymers as described in example 4.

I. COMPARATIVE EXAMPLE 5

Multi-layer film with the structure
PA/K/(90% PP2+10% VLDPE)
70/-/50 μm

Film production, polyamide PA, adhesive system K and polypropylene PP2 as described in example 4. The VLDPE used had a density of 904 kg/m³, a crystallite melting point of 99° C. and a melt flow index (MFI 190/2.16) of 1.4 g/10 min.

Tables 1 and 2 show the measured values for film optical properties and mechanical properties, as obtained from the tensile test, for the described films A, B, C, D, E, F, G, H and I. Measurement was made using the methods described above.

TABLE 1

Film optical properties

|  | PP | PE | Density of PE [kg/m³] | Proportion or LLDPE in heat sealing layer [wt. %] | Turbidity [%] |
|---|---|---|---|---|---|
| E. Comparison 1 | PP1 | — | — | 0 | 18 |
| A. Example 1 | PP1 | LLDPE | 935 | 3 | 13 |
| B. Example 2 | PP1 | LLDPE | 935 | 6 | 12 |
| C. Example 3 | PP1 | LLDPE | 935 | 12 | 12 |
| F. Comparison 2 | PP1 | LLDPE | 935 | 24 | 16 |
| G. Comparison 3 | — | LLDPE | 935 | 100 | 23 |
| H. Comparison 4 | PP2 | — | — | 0 | 23 |
| I. Comparison 5 | PP2 | VLDPE | 904 | 10 | 23 |
| D. Example 4 | PP2 | LLDPE | 935 | 10 | 13 |

TABLE 2

Mechanical properties

|  | Proportion of LLDPE in heat sealing layer [wt. %] | Secant modulus [N/mm²] | 5% offset yield stress [N/mm²] | Yield stress [N/mm²] |
|---|---|---|---|---|
| E. Comparison 1 | 0 | 744 | 19.4 | 22.8 |
| A. Example 1 | 3 | 750 | 20.4 | 25.2 |
| B. Example 2 | 6 | 776 | 20.4 | 24.8 |
| C. Example 3 | 12 | 754 | 19.9 | 23.9 |
| F. Comparison 2 | 24 | 736 | 19.2 | 22.6 |
| G. Comparison 3 | 100 | 560 | 15.1 | 18.7 |

On examination of table 1, it is clear that the composite films containing polymer blends prepared from LLDPE and PP1 with 3, 6 and 12 wt. % of LLDPE in the heat sealing layer (examples 1, 2 and 3) are distinctly less turbid than those containing the individual components PP1 (comparative example 1) and LLDPE (comparative example 3) and are also distinctly less turbid than the version containing 24 wt. % of LLDPE in the sealing layer (comparative example 2).

Table 1 furthermore shows the comparison of an LLDPE with a VLDPE. On the basis of another ethylene/propylene copolymer PP2 in the heat sealing layer (comparative example 4), a turbidity of 23% is obtained. If 10 wt. % of a VLDPE of a density of 904 kg/m³ are added (comparative example 5), the same turbidity value of 23% is obtained as is obtained for the pure PP2 heat sealing layer. On the other hand, if an LLDPE with a density within the range according to the invention is used (example 4), a distinct reduction in the turbidity value is achieved.

Table 2 shows that the above also applies analogously to the mechanical properties obtained from tensile testing. The films produced according to the invention with 3, 6 and 12 wt. % of LLDPE in the heat sealing layer (examples 1, 2 and 3) have higher mechanical strength, as may be seen from the measured secant modulus, 5% offset yield stress and yield stress values, while lower values are achieved if the heat sealing layer contains too much VLDPE (comparative examples 2 and 3) or only PP (comparative example 1).

We claim:

1. Transparent, sterilization-resistant film, which is thermoformable and heat-sealable, which film contains at least one polyamide layer and at least one layer of a polymer blend consisting essentially of polypropylene (PP) homopolymer or copolymer and linear low density polyethylene (LLDPE), wherein the proportion of PP in the polymer blend is 81 to 99.8 wt. % and the proportion of LLDPE is 0.2 to 19 wt. % and the LLDPE has a density of between 915 and 950 kg/m³.

2. Film according to claim 1, wherein the PP is a polypropylene homopolymer or a polypropylene copolymer prepared from propylene and a C2 or C4 to C12 alpha olefin.

3. Film according to claim 1, wherein the PP is an ethylene/propylene copolymer with an ethylene content of 1 to 9 mol. %.

4. Film according to claim 1, wherein the LLDPE is a copolymer prepared from ethylene and a C3 to C12 alpha olefin with a melt flow index (MFI 190/2.16) of 0.1 to 20 g/10 min.

5. Film according to claim 1, wherein the LLDPE is a copolymer prepared from ethylene and a C4 or C8 alpha olefin.

6. Film according to claim 1, wherein the polyamide is selected from the group consisting of the aliphatic polyamides polyamide 6, polyamide 11, polyamide 12, polyamide 66, polyamide 6.66, polyamide 6.8, polyamide 6.9, polyamide 6.10, polyamide 6.11, polyamide 6.12, mixtures thereof, copolymers having the same monomer units as one or more of the foregoing, and mixtures of an aromatic and partially aromatic polyamide.

7. Film according to claim 1 wherein the film further comprises at least one bonding layer.

8. Film according to claim 7, wherein the bonding layer is a maleic anhydride grafted ethylene/propylene copolymer.

9. Film according to claim 1, wherein the film has the structure polyamide/bonding layer/polymer blend layer or polyamide/bonding layer/polyamide/bonding layer/polymer blend layer.

10. Film according to claim 1, wherein the total thickness of the film is 15 to 400 μm.

* * * * *